(12) United States Patent
Miyake (10) Patent No.: US 7,848,185 B2
(45) Date of Patent: Dec. 7, 2010

(54) OPTICAL PICKUP

(75) Inventor: Kohji Miyake, Hiroshima (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 232 days.

(21) Appl. No.: 12/191,712

(22) Filed: Aug. 14, 2008

(65) Prior Publication Data

US 2009/0059771 A1    Mar. 5, 2009

(30) Foreign Application Priority Data

Sep. 4, 2007    (JP)    ............... 2007-229560

(51) Int. Cl.
*G11B 7/00*    (2006.01)
(52) U.S. Cl. ............. 369/44.11; 369/44.37; 369/112.01
(58) Field of Classification Search ............ 369/112.01, 369/44.11, 112.06, 112.23, 44.37, 112.22, 369/44.23, 44.14, 112.16, 120
See application file for complete search history.

(56) References Cited

U.S. PATENT DOCUMENTS

| | | | |
|---|---|---|---|
| 2005/0007906 A1 | 1/2005 | Horinouchi et al. | |
| 2005/0219683 A1 | 10/2005 | Ohta et al. | |
| 2005/0248864 A1 | 11/2005 | Tokuhiro et al. | |
| 2006/0002247 A1* | 1/2006 | Kim et al. ................ | 369/44.11 |
| 2006/0285473 A1* | 12/2006 | Kan ....................... | 369/112.16 |
| 2007/0253311 A1* | 11/2007 | Horinouchi et al. .... | 369/112.22 |
| 2008/0031103 A1 | 2/2008 | Horinouchi et al. | |
| 2008/0094943 A1* | 4/2008 | Tomita et al. ............ | 369/13.53 |
| 2008/0117789 A1* | 5/2008 | Yokota et al. .......... | 369/112.01 |
| 2008/0239928 A1* | 10/2008 | Kamioka et al. ....... | 369/112.23 |

FOREIGN PATENT DOCUMENTS

| | | |
|---|---|---|
| JP | 2005-85293 | 3/2005 |
| JP | 2005-141016 | 6/2005 |
| JP | 2005-221988 | 8/2005 |
| JP | 2005-317186 | 11/2005 |
| JP | 2007-293940 | 11/2007 |
| JP | 4193914 | 10/2008 |

\* cited by examiner

*Primary Examiner*—Nabil Z Hindi
(74) *Attorney, Agent, or Firm*—Morrison & Foerster LLP (57) ABSTRACT

An optical pickup includes a blue laser source; a red laser source; an infrared laser source; a blue light objective lens focusing blue light emitted from the blue laser source onto an optical storage medium; and a red and infrared light objective lens focusing red light emitted from the red laser source and infrared light emitted from the infrared laser source onto the optical storage medium. The optical pickup contains a blue light startup mirror separating the blue light from the red and infrared light. The blue light startup mirror is disposed along optical paths extending from the blue laser source, the red laser source, and the infrared laser source to the blue light objective lens and the red and infrared light objective lens. The optical pickup also contains a low blue light transmittance plane and low blue light reflectance plane along an optical branch path extending from the blue light startup mirror to the red and infrared light objective lens. The configuration greatly restrains the spilling of the blue light into the red and infrared light objective lens, preventing degradation of the red and infrared light objective lens.

10 Claims, 2 Drawing Sheets

OPTICAL PICKUP

This nonprovisional application claims priority under U.S.C. §119(a) on Patent Application No. 2007-229560 filed in Japan on Sep. 4, 2007, the entire contents of which are hereby incorporated by reference.

FIELD OF THE INVENTION

The present invention relates to optical pickups for optically writing or reading information on optical discs and like optical information storage media.

BACKGROUND OF THE INVENTION

A lot of activities have been undertaken recently to develop optical pickups that are compatible with, for example, the BD (Blu-ray disc) and the HD-DVD (High Definition-DVD). A blue laser is used in the BD/HD-DVD compatible optical pickup to write or read information on the optical disc. Resin optical components in the optical pickup therefore need to be desired in view of optical resistance against blue light.

Light in the blue region have short wavelengths and very large light energy. In an objective lens made up of a resin base material and a high-refractive-index, anti-reflection film formed on the surface of the base material, the anti-reflection film may absorb light energy at the blue wavelengths and produce heat locally. The heat could reach the base material, deforming the surface of the base material. The heat conducted to the base material would also reduce resistance of the anti-reflection film against abrasion due to different coefficients of expansion of the anti-reflection film and the base material. Meanwhile, without the anti-reflection film being provided on the surface of the base material, the lens shows poor light transmittance and is hence less useful as an optical element. In addition, the surface will more likely degrade in oxidation.

Accordingly, for example, Japanese Unexamined Patent Publication No. 2005-317186 (Tokukai 2005-317186; published Nov. 10, 2005) teaches a technique of restraining deformation of the base material surface without reducing the light transmittance by providing an anti-reflection film having a refractive index of 1.7 or less on the base material surface. The anti-reflection film has a medium to low refractive index and produces less heat under radiation in the ultraviolet region than an anti-reflection film containing a layer with a high refractive index. The anti-reflection film thus restrains deformation of the base material surface without reducing the light transmittance even under high-optical-energy, short-wavelength light, including blue light.

BD/HD-DVD compatible optical pickups are often designed to operate with conventional DVDs and CDs. In that case, two objective lens are needed: one for blue light and the other for red and infrared light. The blue light objective lens, since designed for blue light, is made of a material which itself has a low absorption rate for blue light. The provision of the anti-reflection film of Tokukai 2005-317186 is effective.

On the other hand, however, conventional objective lenses for red and infrared light are made of olefin-based or alicyclic olefin-based resins. These materials themselves have a high absorption rate for blue light. No special consideration is paid to the anti-reflection film formed on the surface of those lenses as in Tokukai 2005-317186. The film degrades by absorbing light energy even from a small amount of blue light.

Table 1 shows data for various BD-R/RE writing schemes. Table 1 indicates that the net amount of blue light projected onto a blue light objective lens is 9.55 Wh/mm² for SL×1 writing of a BD-RE. Meanwhile, for example, an objective lens made of resin for red and infrared light develops a defect when the net amount of light is in excess of 0.25 Wh/mm². The figures predict that if about 3% of the blue light aimed at the blue light objective lens spills into the red and infrared light objective lens, it would be sufficient to degrade the red and infrared light objective lens.

TABLE 1

| BD-R/RE Writing | Writing Power (mW) | Effective Area of Objective Lens (mm²) | Radiation Hours (h) | Radiation Pulse Duty | Net Amount of Radiation (Wh/mm²) | Net Amount of Radiation (0.25 Wh/mm² Ratio) |
|---|---|---|---|---|---|---|
| DL × 2 | 14 | 3.14 | 10,000 | 50% | 22.28 | 1.1% |
| DL × 1 | 12 | 3.14 | 10,000 | 50% | 19.10 | 1.3% |
| SL × 2 | 7 | 3.14 | 10,000 | 50% | 11.14 | 2.2% |
| SL × 1 | 6 | 3.14 | 10,000 | 50% | 9.55 | 2.6% |

SL: Single Layer Disc
DL: Double Layer Disc
×1: Standard Speed
×2: Double Speed

In the case of DL×2 writing, if only about 1% of the blue light spills into the red and infrared light objective lens, it would be sufficient to degrade the red and infrared light objective lens. So, far more stringent specifications are required for writing at double or even faster speed. Therefore, the blue light needs to be somehow prevented from spilling into the red and infrared light objective lens if a conventional red and infrared light objective lens is used in a BD/HD-DVD compatible optical pickup. It is difficult to form a single surface which transmits or reflects a few percent or even less of incoming blue light and also costly to fabricate such a film surface.

SUMMARY OF THE INVENTION

The present invention, conceived in view of these conventional problems, has an objective of providing an optical pickup that prevents the degradation of the red and infrared light objective lens by drastically reducing the blue light spilling into the red and infrared light objective lens.

The optical pickup of the present invention, to address the problems, includes: a blue laser source; at least either one of a red laser source and an infrared laser source; a blue light objective lens focusing blue light emitted from the blue laser source onto an optical storage medium; and a red and infrared light objective lens focusing red light emitted from the red laser source and infrared light emitted from the infrared laser source onto the optical storage medium. The optical pickup is characterized in that it includes optical path branching means for separating the blue light from the red and infrared light, the optical path branching means being provided along optical paths extending from the blue laser source, the red laser source, and the infrared laser source to the blue light objective lens and the red and infrared light objective lens and also in that there is provided blue light decay means for decaying the blue light along an optical branch path extending from the optical path branching means to the red and infrared light objective lens.

According to the configuration, there is provided blue light decay means for decaying the blue light along the optical branch path. The provision only allows a drastically reduced proportion of the blue light having spilled through the optical path branching means into the optical branch path to reach the red and infrared light objective lens. Therefore, the spilling of the blue light into the red and infrared light objective lens is greatly restrained. The red and infrared light objective lens is prevented from degradation caused by absorption of the blue light.

Additional objects, advantages and novel features of the invention will be set forth in part in the description which follows, and in part will become apparent to those skilled in the art upon examination of the following or may be learned by practice of the invention.

DESCRIPTION OF THE EMBODIMENTS

Embodiment 1

The following will describe an embodiment of the present invention in reference to drawings. The description will first deal briefly with the overall configuration of the optical pickup 100 of the present embodiment and after that, give details on structural features of the optical pickup 100 of the present embodiment.

Figure 1:
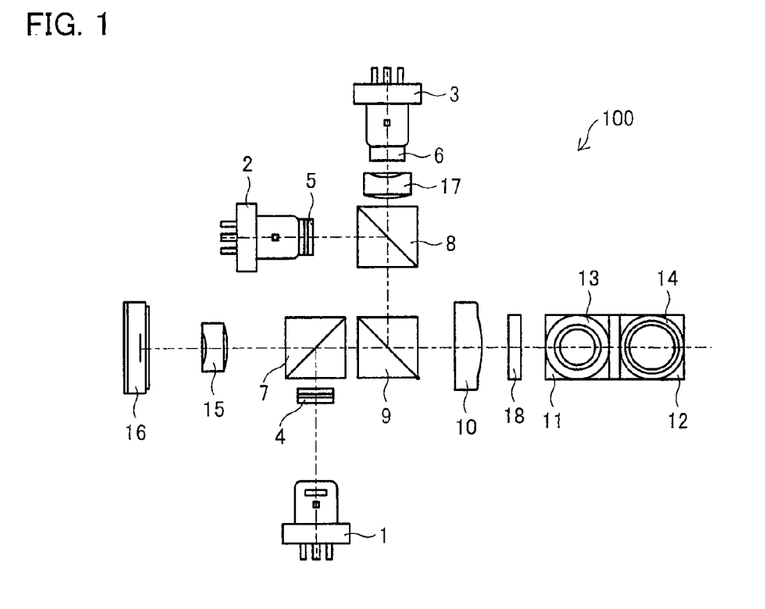
FIG. 1 is a schematic illustration of an optical configuration for the optical pickup of the present invention.

FIG. 1 is a schematic illustration of the overall configuration of the optical pickup 100 of the present embodiment as viewed from above. The optical pickup 100 is not necessarily configured as shown in FIG. 1. The optical pickup 100 can be configured in various other ways so long as the optical pickup 100 can deliver desired functionality as an optical pickup.

The optical pickup 100 of the present embodiment includes, as illustrated in FIG. 1, a blue laser (blue laser source) 1, a red laser (red laser source) 2, an infrared laser (infrared laser source) 3, a blue light diffraction grating 4, a red light diffraction grating 5, an infrared light diffraction grating 6, a blue light beam splitter 7, a red and infrared light dichroic prism 8, a red and infrared light beam splitter 9, a collimating lens 10, a blue light startup mirror 11, a red and infrared light startup mirror 12, a blue light objective lens 13, a red and infrared light objective lens 14, a sensor lens 15, a PDIC 16, an infrared coupling lens 17, and a quarter-wave plate 18.

The optical pickup 100 of the present embodiment, including three lasers (i.e. the blue laser 1, the red laser 2, and the infrared laser 3), is compatible with three wavelengths, blue, red, and infrared. The optical pickup 100 of the present embodiment can hence read and write data information on blue light compatible optical discs, such as BDs and HD-DVDs, and red and infrared light compatible optical discs, such as DVDs and CDs.

The BD and HD standards require the blue laser to emit at a wavelength of about 405 nm. Therefore, for the optical pickup 100 of the present embodiment, the blue laser 1 is assumed to emit a blue laser beam at a wavelength of 405 nm±15 nm (from 390 nm to 420 nm, inclusive). The setup enables the pickup 100 to properly work with the BD, the HD-DVD, and other blue light discs without any serious problems.

The blue light emitted from the blue laser 1 passes through the blue light diffraction grating 4 used for tracking servo and reflects off the blue light beam splitter 7, changing direction. After passing through the red and infrared light beam splitter 9, the light is turned parallel by the collimating lens 10. The parallel blue light passes through the quarter-wave plate 18 and reflects off the blue light startup mirror 11, changing direction. The light is focused by the blue light objective lens 13 onto the optical disc. The blue light startup mirror 11 is an optical path branching element which separates blue light from red and infrared light (will be detailed later).

The blue light reflecting off the optical disc is turned parallel by the blue light objective lens 13 and reflects off the blue startup mirror 11, changing direction. After passing through the quarter-wave plate 18, the light is converged by the collimating lens 10. After that, the converged blue light passes through the red and infrared light beam splitter 9 and the blue light beam splitter 7 and is given astigmatism for focus servo by the sensor lens 15 and focused onto the PDIC 16 which is an IC chip containing a photo diode (PD). In the PDIC 16, the blue light is received and converted to a read signal, a servo signal, etc. by the PD.

Meanwhile, the red light emitted from the red laser 2 passes through the red light diffraction grating 5 used for tracking servo and reflects off the red and infrared light dichroic prism 8, changing direction. The infrared light emitted from the infrared laser 3 passes through the infrared light diffraction grating 6 used for tracking servo and is guided through the infrared coupling lens 17 for better coupling efficiency. The light then passes through the red and infrared light dichroic prism 8 and hereafter follows the same optical path as the red light emitted from the red laser 2.

The red light reflecting off the red and infrared light dichroic prism 8 and the infrared light passing through the red and infrared light dichroic prism 8 both reflect off the red and infrared light beam splitter 9, changing direction, and are turned substantially parallel by the collimating lens 10. The parallel red and infrared light passes the quarter-wave plate 18 and then the blue light startup mirror 11 and reflects off the red and infrared light startup mirror 12, changing direction. The red and infrared light is focused by the red and infrared light objective lens 14 onto the optical disc.

The red and infrared light reflecting off the optical disc is again turned substantially parallel by the red and infrared light objective lens 14 and reflects off the red and infrared light startup mirror 12, changing direction. The light passes the blue light startup mirror 11 and then the quarter-wave plate 18 and is converged by the collimating lens 10. After that, the converged red and infrared light passes through the red and infrared light beam splitter 9 and the blue light beam splitter 7 and is given astigmatism for focus servo by the sensor lens 15 and focused onto the PDIC 16. In the PDIC 16, the red and infrared light is received and converted to a read signal, a servo signal, etc. by the PD.

The blue light objective lens 13 is made of resin and designed for blue light. The material itself therefore has a low absorption rate for blue light. The blue light objective lens 13 has provided on a light-incident surface thereof an anti-reflection film which is resistant to light energy at blue wavelengths.

The red and infrared light objective lens 14 is made of a conventional, ordinary olefin-based or alicyclic olefin-based resin. The red and infrared light objective lens 14 has provided on a light-incident surface thereof an anti-reflection film which is resistant to light energy at red and infrared wavelengths.

Now, the structural features of the optical pickup 100 of the present embodiment is described in detail.

Figure 2:
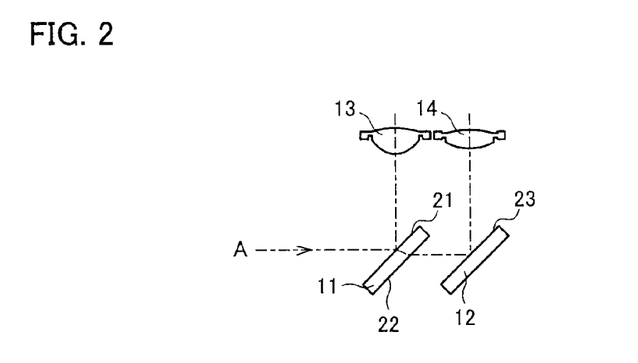
FIG. 2 is a side view of a specific structural example of a part of the optical configuration of the optical pickup, from an optical path branching plane to each objective lens.

FIG. 2 is a side view of a part of the optical pickup 100 of the present embodiment including the blue light startup mirror 11, the red and infrared light startup mirror 12, the blue light objective lens 13, and the red and infrared light objective lens 14.

Arrow A indicates an incoming direction of a beam: specifically, the direction of the light traveling from the quarter-wave plate 18 to the blue light startup mirror 11. Hereinafter, the direction will be referred to as the beam entering direction A.

The blue light startup mirror 11 is planar and disposed in such a manner as to form an appropriate angle between the beam entering direction A and the incident surface in order to change the optical path of the blue light traveling in the beam entering direction A to a direction in which the blue light objective lens 13 is located. The blue light startup mirror 11, used as an optical path branching element (optical path branching means), has a blue vs. red/infrared light path branching plane 21 provided on a surface thereof through which the light traveling in the beam entering direction A enters the mirror 11. The plane 21 separates blue light from red and infrared light.

The blue vs. red/infrared light path branching plane 21 reflects blue light and transmits red and infrared light and is made of a low blue light transmittance film which has a low transmittance for blue light. The mirror 11 has a low blue light transmittance plane 22 provided on a surface thereof through which the light traveling in the beam entering direction A exits the mirror 11, or in other words, on the opposite surface to the plane 21. The plane 22 transmits red and infrared light and has a low transmittance for blue light.

The red and infrared light startup mirror 12 is planar and disposed in such a manner as to form an appropriate angle between the exiting direction through the low blue light transmittance plane 22 and the incident surface in order to change the optical path of the red and infrared light transmitted by the blue light startup mirror 11, or in other words, the red and infrared light exiting the blue light startup mirror 11 through the low blue light transmittance plane 22, to a direction in which the red and infrared light objective lens 14 is located. The red and infrared light startup mirror 12 has a low blue light reflectance plane 23 provided on a surface thereof off which the red and infrared light transmitted by the blue light startup mirror 11 is reflected. The plane 23 has a low reflectance for blue light.

A plane with a low transmittance for blue light ("low blue light transmittance plane") is defined as an optical plane which has a lower transmittance for blue light than a reflectance for blue light. In contrast, a plane with a low reflectance for blue light ("low blue light reflectance plane") is defined as an optical plane which has a lower reflectance for blue light than a transmittance for blue light. Accordingly the blue vs. red/infrared light path branching plane 21 and the low blue light transmittance plane 22 are low blue light transmittance planes with a lower transmittance for blue light than a reflectance for blue light. The low blue light reflectance plane 23 is a low blue light reflectance plane with a lower reflectance for blue light than a transmittance for blue light.

Now, the path of the light traveling in the beam entering direction A is described in detail.

If the light traveling in the beam entering direction A is red and infrared light, the red and infrared light passes through the blue vs. red/infrared light path branching plane 21 and the low blue light transmittance plane 22, both planes provided on the blue light startup mirror 11, and travels further toward the red and infrared light startup mirror 12. The red and infrared light reflects off the low blue light reflectance plane 23 on the red and infrared light startup mirror 12, changing its traveling direction to a direction of the red and infrared light objective lens 14, and travels further toward the red and infrared light objective lens 14.

If the light traveling in the beam entering direction A is blue light, the blue light reflects off the blue vs. red/infrared light path branching plane 21 on the blue light startup mirror 11, changing its traveling direction to a direction of the blue light objective lens 13, and travels further toward the blue light objective lens 13.

The blue light however can in some cases pass through the blue vs. red/infrared light path branching plane 21, without totally reflecting off the blue vs. red/infrared light path branching plane 21 on the blue light startup mirror 11. In those cases, conventionally, for example, the blue light having passed through the plane 21 spills into the red and infrared light objective lens 14 made of material which itself has a high absorption rate for blue light (olefin-based or alicyclic olefin-based resin). The red and infrared light objective lens 14 thus absorbs the blue light and degrades.

In contrast, in the optical pickup 100 of the present embodiment, the blue light having passed through the blue vs. red/infrared light path branching plane 21 reaches the low blue light transmittance plane 22 before reaching the red and infrared light objective lens 14. If the blue light again passes through the low blue light transmittance plane 22, it still reaches the low blue light reflectance plane 23 before reaching the red and infrared light objective lens 14. Only the blue light reflecting off the low blue light reflectance plane 23 can travel toward the red and infrared light objective lens 14. In short, the blue light having passed through the blue vs. red/infrared light path branching plane 21 must pass through the low blue light transmittance plane 22 and the low blue light reflectance plane 23 before it can reach the red and infrared light objective lens 14.

Supposing, for example, a blue light transmittance of 5% for the blue vs. red/infrared light path branching plane 21, a blue light transmittance of 30% for the low blue light transmittance plane 22, and a blue light reflectance of 30% for the low blue light reflectance plane 23, the blue light traveling toward the red and infrared light objective lens 14 is as little as 0.45% the blue light traveling toward the blue light objective lens 13. The configuration thus successfully addresses the conventional problem of the red and infrared light objective lens 14 being degraded by blue light.

As detailed in the foregoing, the optical pickup 100 of the present embodiment is provided with the low blue light transmittance plane 22 and the low blue light reflectance plane 23, which together form blue light decay means for decaying blue light, along an optical branch path extending from the blue vs. red/infrared light path branching plane 21 on the blue light startup mirror 11 to a surface of the red and infrared light objective lens 14.

The plane 21 separates blue light from red and infrared light.

Conventionally, it is generally difficult to form a single low blue light transmittance or reflectance plane (as low as a few percent or even less) and also costly to fabricate such a film surface.

In contrast, in the optical pickup 100 of the present embodiment, there are provided multiple low blue light transmittance or reflectance planes which together readily achieves a transmittance or reflectance of a few percent or even less. In other words, the optical pickup 100 of the present embodiment includes the low blue light transmittance plane 22 and the low blue light reflectance plane 23, and, for example, if the blue vs. red/infrared light path branching plane 21 has a blue light transmittance of 10%, the low blue light transmittance plane 22 has a blue light transmittance of 10%, and the low blue light reflectance plane 23 has a blue light reflectance of 10%, the optical path achieves a net decay ratio of 0.1% for blue light.

The configuration only allows a drastically reduced proportion of the blue light having spilled into the optical path extending from the blue vs. red/infrared light path branching plane 21 to a surface of the red and infrared light objective lens 14 to reach the red and infrared light objective lens 14. Therefore, the spilling of the blue light into the red and infrared light objective lens 14 is greatly restrained. The red and infrared light objective lens 14 is prevented from degradation caused by absorption of the blue light.

The blue vs. red/infrared light path branching plane 21, the low blue light transmittance plane 22, and the low blue light reflectance plane 23 preferably have a wavelength selection range of 405 nm±15 nm in accordance with the wavelength of the blue laser emitted from the blue laser 1. The settings enable effective use of the specified transmittance and reflectance. If the wavelength of the blue laser emitted from the blue laser 1 is changed, the wavelength selection range may of course be changed according to the change in the wavelength.

The blue vs. red/infrared light path branching plane 21 made of a low blue light transmittance film which has a low transmittance for blue light and the low blue light transmittance plane 22 which has a low transmittance for blue light preferably have a transmittance of not more than 30% for 405 nm±15 nm blue light. The low blue light reflectance plane 23 which has a low reflectance for blue light preferably has a reflectance of not more than 30% for 405 nm±15 nm blue light. These settings enable, for example, at least a total of two low blue light transmittance planes and low blue light reflectance planes to readily achieve a net transmittance or reflectance of not more than 9%.

The net transmittance or reflectance, that is, the decay ratio, is preferably not more than 3% for 405 nm±15 nm blue light. These settings greatly restrains the spilling of the blue light into the red and infrared light objective lens 14 and better prevents the red and infrared light objective lens 14 from degrading.

The use of the blue light startup mirror 11 as an optical path branching element facilitates the provision of the low blue light transmittance plane and the low blue light reflectance plane on the plane where blue light is separated from red and infrared light, that is, along the optical path extending from the blue vs. red/infrared light path branching plane 21 to the red and infrared light objective lens 14. In addition, the configuration has dimensional merits, making it possible to reduce the size of the device. The configuration also requires fewer components, contributing to cost reduction.

Figure 3:
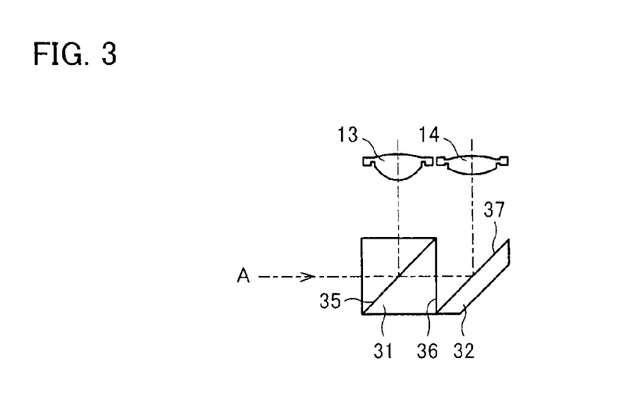
FIG. 3 is a side view of another specific structural example of the same part of the optical configuration of the optical pickup, from the optical path branching plane to the objective lenses.

The optical path branching element however is not limited to the blue light startup mirror 11. FIG. 3 shows a cubical blue light startup mirror 31 and a red and infrared light startup mirror 32 provided in place of the blue light startup mirror 11 and the red and infrared light startup mirror 12 shown in FIG. 2.

The cubical blue light startup mirror 31 has a cubical shape and includes therein a startup mirror section so as to change the optical path of the blue light traveling in the beam entering direction A to a direction in which the blue light objective lens 13 is located. The cubical blue light startup mirror 31, used as an optical path branching element (optical path branching means), has a blue vs. red/infrared light path branching plane (low blue light transmittance internal plane) 35 in the startup mirror section to which the light traveling in the beam entering direction A enters the mirror 31. The plane 35 separates blue light from red and infrared light.

The blue vs. red/infrared light path branching plane 35 reflects blue light and transmits red and infrared light and is made of a low blue light transmittance film which has a low transmittance for blue light. The plane 35 has a low blue light transmittance plane 36 provided on an external face thereof through which the light traveling in the beam entering direction A exits the cubical blue light startup mirror 31. The plane 36 transmits red and infrared light and has a low transmittance for blue light.

The red and infrared light startup mirror 32 is trapezoidal in its cross-section taken parallel to the beam entering direction A. The mirror 32 is disposed in such a manner as to form an appropriate angle between the exiting direction through the low blue light transmittance plane 36 and the incident surface in order to change the optical path of the red and infrared light transmitted by the cubical blue light startup mirror 31, or in other words, the red and infrared light exiting the cubical blue light startup mirror 31 through the low blue light transmittance plane 36, to a direction in which the red and infrared light objective lens 14 is located. The red and infrared light startup mirror 32 has a low blue light reflectance plane 37 provided on a surface thereof off which the red and infrared light transmitted by the cubical blue light startup mirror 31 is reflected. The plane 37 has a low reflectance for blue light.

In the configuration, similarly to the optical paths described in reference to FIG. 2, the blue light reflects off the blue vs. red/infrared light path branching plane 35 on the cubical blue light startup mirror 31 and travels further toward the blue light objective lens 13. The red and infrared light passes through the blue vs. red/infrared light path branching plane 35, the low blue light transmittance plane 36, and the low blue light reflectance plane 37 in this order and travels further toward the red and infrared light objective lens 14.

The blue light having passed the blue vs. red/infrared light path branching plane 35, however, must pass through the low blue light transmittance plane 36 and the low blue light reflectance plane 37 before it can reach the red and infrared light objective lens 14.

As detailed in the foregoing, the low blue light transmittance plane 36 and the low blue light reflectance plane 37, which together form blue light decay means for decaying blue light, are provided along an optical branch path extending from the blue vs. red/infrared light path branching plane 35 on the cubical blue light startup mirror 31 to a surface of the red and infrared light objective lens 14. The plane 35 separates blue light from red and infrared light.

Supposing, for example, a blue light transmittance of 5% for the blue vs. red/infrared light path branching plane 35, a blue light transmittance of 30% for the low blue light transmittance plane 36, and a blue light reflectance of 30% for the low blue light reflectance plane 37, the blue light traveling toward the red and infrared light objective lens 14 is as little as 0.45% the blue light traveling toward the blue light objective lens 13. The configuration thus successfully addresses the conventional problem of the red and infrared light objective lens 14 being degraded by blue light.

The use of the cubical blue light startup mirror 31 as an optical path branching element causes the red and infrared light to pass through the cubical blue light startup mirror 31. The configuration causes no shift of the optical axis, making it easy to design the device. The configuration also makes it easy to assemble the device, enabling reductions in assembly time.

Figure 4:
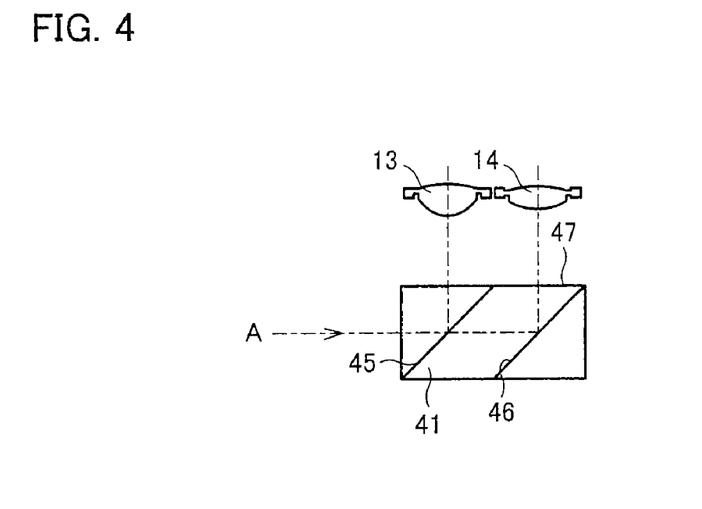
FIG. 4 is a side view of a further specific structural example of the same part of the optical configuration of the optical pickup, from the optical path branching plane to the objective lenses.

A composite startup mirror 41 shown in FIG. 4 may be used as the optical path branching element. FIG. 4 shows the composite startup mirror 41 provided in place of the blue light startup mirror 11 and the red and infrared light startup mirror 12 shown in FIG. 2.

The composite startup mirror 41 is prismatic and integrates a blue light startup mirror and the red and infrared light startup mirror 12. In the mirror 41, a blue light startup mirror section and a red and infrared light startup mirror section are provided in this order when viewed in the beam entering direction A.

The blue light startup mirror section is disposed so as to change the optical path of the blue light traveling in the beam entering direction A to a direction in which the blue light objective lens 13 is located. The blue light startup mirror section has a blue vs. red/infrared light path branching plane 45 provided on a surface thereof off which the light traveling in the beam entering direction A is reflected. The plane 45 separates blue light from red and infrared light. The blue vs. red/infrared light path branching plane 45 reflects blue light and transmits red and infrared light and is made of a low blue light transmittance film which has a low transmittance for blue light.

The red and infrared light startup mirror section is disposed so as to change the optical path of the red and infrared light transmitted by the blue vs. red/infrared light path branching plane 45 to a direction in which the red and infrared light objective lens 14 is located. The red and infrared light startup mirror section has a low blue light reflectance plane 46 provided on a surface thereof off which the red and infrared light transmitted by the blue vs. red/infrared light path branching plane 45 is reflected. The plane 46 has a low reflectance for blue light. The composite startup mirror 41 has a low blue light transmittance plane 47 on a surface thereof from which the red and infrared light reflecting off the low blue light reflectance plane 46 exits the mirror 41. The plane 47 has a low transmittance for blue light.

In the configuration, similarly to the optical paths described in reference to FIG. 2, the blue light reflects off the blue vs. red/infrared light path branching plane 45 on the composite startup mirror 41 and travels further toward the blue light objective lens 13. The red and infrared light passes through the blue vs. red/infrared light path branching plane 45, the low blue light reflectance plane 46, and the w blue light transmittance plane 47 in this order and travels further toward the red and infrared light objective lens 14.

The blue light having passed through the blue vs. red/infrared light path branching plane 45, however, must pass through the low blue light reflectance plane 46 and the low blue light transmittance plane 47 before it can reach the red and infrared light objective lens 14.

As detailed in the foregoing, the low blue light reflectance plane 46 and the low blue light transmittance plane 47, which together form blue light decay means for decaying blue light, are provided along an optical branch path extending from the blue vs. red/infrared light path branching plane 45 on the composite startup mirror 41 to a surface of the red and infrared light objective lens 14. The plane 45 separates blue light from red and infrared light.

Supposing, for example, a blue light transmittance of 5% for the blue vs. red/infrared light path branching plane 45, a blue light reflectance of 30% for the low blue light reflectance plane 46, and a blue light transmittance of 30% for the low blue light transmittance plane 47, the blue light traveling toward the red and infrared light objective lens 14 is as little as 0.45% the blue light traveling toward the blue light objective lens 13. The configuration thus successfully addresses the conventional problem of the red and infrared light objective lens 14 being degraded by blue light.

The use of the composite startup mirror 41 as an optical path branching element makes it easier to assemble the device than when the blue light startup mirror 11 or the cubical blue light startup mirror 31 is used as an optical path branching element. The configuration allows for lower assembly precision, enabling reductions in assembly time.

In the optical pickup 100 of the present embodiment, there are a single low blue light transmittance plane and a single low blue light reflectance plane along the optical path extending from the blue vs. red/infrared light path branching plane separating blue light from red and infrared light to a surface of the red and infrared light objective lens 14. Alternatives are also possible. For example, multiple low blue light transmittance planes and multiple low blue light reflectance planes may be provided. The planes may also be provided in any layout (sequence). These cases will be described below by way of an example in embodiment 2.

Multiple low blue light transmittance planes may be provided along with a single low blue light reflectance plane, depending on the design of optical components of the optical pickup. Likewise, multiple low blue light reflectance planes may be provided along with a low blue light transmittance plane. In short, only blue light decay means for decaying blue light needs to be provided along the optical path extending from the blue vs. red/infrared light path branching plane to a surface of the red and infrared light objective lens 14. No matter how the optical path is arranged, the present invention is applicable in a suitable manner.

The optical pickup 100 of the present embodiment is effective although it contains the red and infrared light objective lens 14 made of olefin-based or alicyclic olefin-based resin used in many conventional applications. Therefore, the present invention is applicable in a suitable manner even if an optical pickup compatible with the BD, the HD-DVD, or other like media utilizing blue light is provided with a red and infrared light objective lens made of an ordinary resin so that the pickup is compatible with the DVD, the CD, and other like media utilizing red and infrared light. In addition, any red and infrared light objective lens made of an ordinary resin can be used; the optical pickup can be manufactured at low cost.

Embodiment 2

The following will describe another embodiment of the present invention in reference to drawings. The present embodiment is the same as embodiment 1 unless otherwise described below. For convenience, members of the present embodiment that have the same arrangement and function as members of embodiment 1, and that are mentioned in that embodiment are indicated by the same reference numerals and description thereof is omitted.

Figure 5:
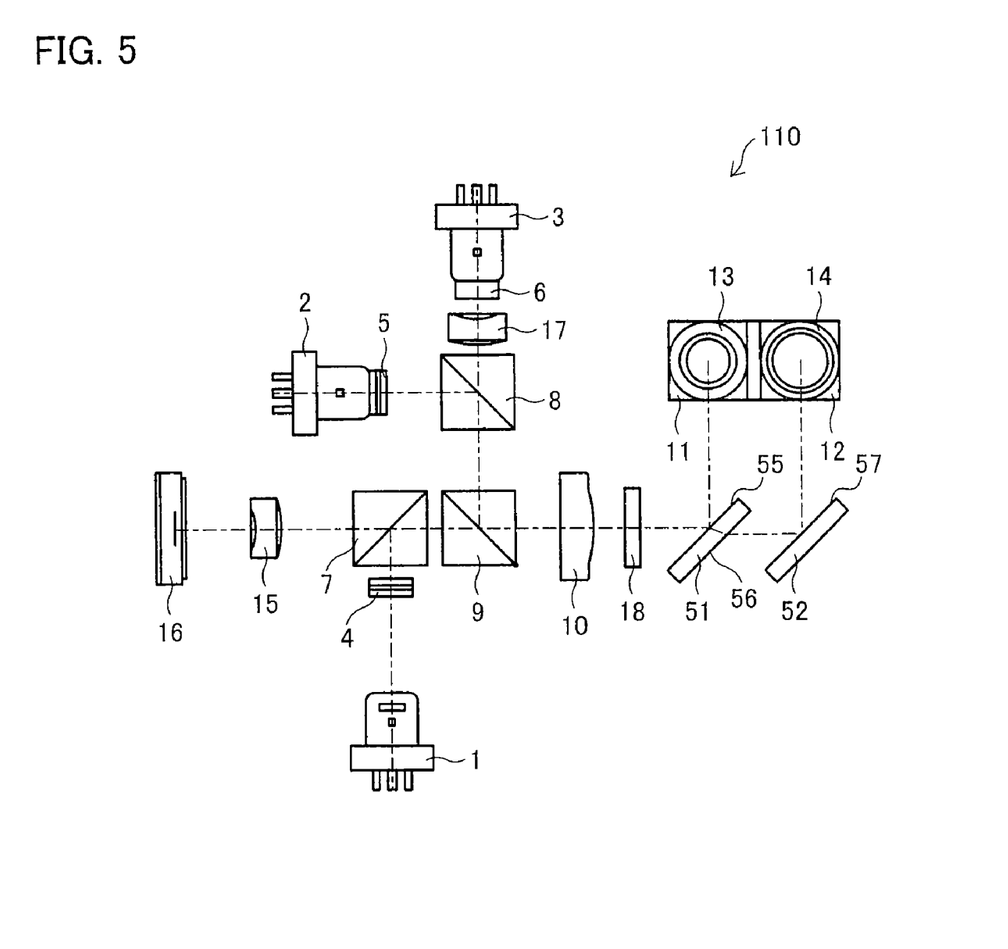
FIG. 5 is a schematic illustration of another optical configuration for the optical pickup of the present invention.

FIG. 5 is a schematic illustration of the overall configuration of an optical pickup 110 of the present embodiment as viewed from above. The optical pickup 110 is not necessarily configured as shown in FIG. 5. The optical pickup 110 can be configured in various other ways so long as the optical pickup 110 can deliver desired functionality as an optical pickup.

The optical pickup 110 of the present embodiment includes a first reflective mirror 51 and a second reflective mirror 52 as illustrated in FIG. 5, as well as all the structural elements of the optical pickup 100 detailed in embodiment 1. In the optical pickup 110 of the present embodiment, the blue light startup mirror 11 has no low blue light transmittance plane 22 provided thereon.

The first reflective mirror 51 is planar and disposed between the quarter-wave plate 18 and the blue light startup mirror 11 at such an appropriate angle as to change the optical path of the blue light exiting the quarter-wave plate 18 to a direction in which the blue light startup mirror 11 is located. The first reflective mirror 51, used as an optical path branching element (optical path branching means), has a blue vs. red/infrared light path branching plane 55 provided on a surface thereof through which the light exiting the quarter-wave plate 18 enters the mirror 51. The plane 55 separates blue light from red and infrared light.

The blue vs. red/infrared light path branching plane 55 reflects blue light and transmits red and infrared light and is made of a low blue light transmittance film which has a low transmittance for blue light. The mirror 51 has a low blue light transmittance plane 56 provided on a surface thereof through which the light exiting the quarter-wave plate 18 exits the mirror 51, or in other words, on the opposite surface to the plane 55. The plane 56 transmits red and infrared light and has a low transmittance for blue light.

The second reflective mirror 52 is planar and disposed between the first reflective mirror 51 and the red and infrared light startup mirror 12 at such an appropriate angle as to change the optical path of the red and infrared light transmitted by the first reflective mirror 51, or in other words, the red and infrared light exiting the first reflective mirror 51 through the low blue light transmittance plane 56, to a direction in which the red and infrared light startup mirror 12 is located. The second reflective mirror 52 has a low blue light reflectance plane 57 provided on a surface thereof off which the red and infrared light transmitted by the first reflective mirror 51 is reflected. The plane 57 has a low reflectance for blue light.

The optical pickup 110 of the present embodiment configured as above has the same optical path as the optical pickup 100 of embodiment 1, except those segments from the quarter-wave plate 18 to the blue light objective lens 13 and to the red and infrared light objective lens 14. Accordingly, the optical path of the light exiting the quarter-wave plate 18 is described next in detail.

If the light exiting the quarter-wave plate 18 is red and infrared light, the red and infrared light passes through the blue vs. red/infrared light path branching plane 55 and then the low blue light transmittance plane 56, both planes provided on the first reflective mirror 51, and travels further toward the second reflective mirror 52. The red and infrared light reflects off the low blue light reflectance plane 57 on the second reflective mirror 52, changing its traveling direction to a direction of the red and infrared light startup mirror 12, and travels further toward the red and infrared light startup mirror 12. Finally, the red and infrared light reflects off the low blue light reflectance plane 23 on the red and infrared light startup mirror 12, changing its traveling direction to a direction of the red and infrared light objective lens 14, and travels further toward the red and infrared light objective lens 14.

If the light exiting the quarter-wave plate 18 is blue light, the blue light reflects off the blue vs. red/infrared light path branching plane 55 on the first reflective mirror 51, changing its traveling direction to a direction of the blue light startup mirror 11, and travels further toward the blue light startup mirror 11. The blue light then reflects off the blue light startup mirror 11, changing its traveling direction to a direction of the blue light objective lens 13, and travels further toward the blue light objective lens 13.

As mentioned earlier, however, the blue light can in some cases pass through the blue vs. red/infrared light path branching plane 55 without totally reflecting off the blue vs. red/infrared light path branching plane 55 on the first reflective mirror 51. In those cases, the blue light having passed through the plane 55 spills into the red and infrared light objective lens 14 which absorbs the blue light and degrades.

In contrast, in the optical pickup 110 of the present embodiment, the blue light having passed through the blue vs. red/infrared light path branching plane 55 reaches the low blue light transmittance plane 56 before reaching the red and infrared light objective lens 14. If the blue light again passes through the low blue light transmittance plane 56, it still reaches the low blue light reflectance plane 57 before reaching the red and infrared light objective lens 14. If the blue light reflects off the low blue light reflectance plane 57, it still reaches the low blue light reflectance plane 23 before reaching the red and infrared light objective lens 14. Only the blue light reflecting off the low blue light reflectance plane 23 can travel toward the red and infrared light objective lens 14. In short, the blue light having passed through the blue vs. red/infrared light path branching plane 55 must pass the low blue light transmittance plane 56, the low blue light reflectance plane 57, and the low blue light reflectance plane 23 before it can reach the red and infrared light objective lens 14.

Supposing, for example, a blue light transmittance of 5% for the blue vs. red/infrared light path branching plane 55, a blue light transmittance of 30% for the low blue light transmittance plane 56, a blue light reflectance of 30% for the low blue light reflectance plane 57, and a blue light reflectance of 30% for the low blue light reflectance plane 23, the blue light traveling toward the red and infrared light objective lens 14 is as minuscule as 0.135% the blue light traveling toward the blue light objective lens 13. The configuration thus more successfully addresses the conventional problem of the red and infrared light objective lens 14 being degraded by blue light.

As detailed in the foregoing, the optical pickup 110 of the present embodiment is provided with the low blue light transmittance plane 56, the low blue light reflectance plane 57, and the low blue light reflectance plane 23, which together form blue light decay means for decaying blue light, along an optical branch path extending from the blue vs. red/infrared light path branching plane 55 on the first reflective mirror 51 to a surface of the red and infrared light objective lens 14. The plane 55 separates blue light from red and infrared light.

The low blue light transmittance plane 56, the low blue light reflectance plane 57, and the low blue light reflectance plane 23 are provided. If, for example, the blue vs. red/infrared light path branching plane 55 has a blue light transmittance of 10%, the low blue light transmittance plane 56 has a blue light transmittance of 20%, the low blue light reflectance plane 57 has a blue light reflectance of 20%, and the low blue light reflectance plane 23 has a blue light reflectance of 20%, the optical path achieves a net decay ratio of 0.08% for blue light.

The configuration only allows a drastically reduced proportion of the blue light having spilled into the optical path extending from the blue vs. red/infrared light path branching plane 55 to a surface of the red and infrared light objective lens 14 to reach the red and infrared light objective lens 14. Therefore, the spilling of the blue light into the red and infrared light objective lens 14 is greatly restrained. The red and infrared light objective lens 14 is prevented from degradation caused by absorption of the blue light.

The blue light objective lens 13 and the red and infrared light objective lens 14 were positioned as detailed above in the optical pickup 100 of embodiment 1 shown in FIG. 1 and the optical pickup 110 of the present embodiment shown in FIG. 5. This is not the only possibility. The blue light objective lens 13 and the red and infrared light objective lens 14 may be transposed.

For example, if the blue light objective lens 13 and the red and infrared light objective lens 14 are to be transposed in the optical pickup 100 of embodiment 1, the blue light startup mirror 11 and the red and infrared light startup mirror 12 should be transposed, and blue light decay means for decaying blue light should be provided along an optical branch path extending from the low blue light reflectance plane 23 on the red and infrared light startup mirror 12 to a surface of the red and infrared light objective lens 14. As in this example, the red and infrared light objective lens 14 can be used as an optical path branching element (optical path branching means).

If the blue light objective lens 13 and the red and infrared light objective lens 14 are to be transposed in the optical pickup 110 of the present embodiment as another example, the low blue light transmittance plane 56 on the first reflective mirror 51, the low blue light reflectance plane 57 on the second reflective mirror 52, and the low blue light reflectance plane 23 on the red and infrared light startup mirror 12 are not needed, the blue vs. red/infrared light path branching plane 55 on the first reflective mirror 51 should be formed of a low blue light reflectance film which has a low reflectance for blue light, and the blue light startup mirror 11 should be provided with a low blue light reflectance plane.

The present invention is not limited to the description of the embodiments above, but may be altered by a skilled person within the scope of the claims. An embodiment based on a proper combination of technical means disclosed in different embodiments is encompassed in the technical scope of the present invention.

The present invention is applicable to optical pickups which, in order to optically write or read information to an optical disc or like information storage medium, use a blue laser, a red laser, and an infrared laser in accordance with the type of the optical disc. Specifically, the invention is applicable to optical pickup which operate with the BD, HD-DVD, DVD, CD, etc.

As described in the foregoing, the optical pickup of the present invention includes optical path branching means for separating blue light from red and infrared light provided along optical paths extending from a blue laser source, a red laser source, and an infrared laser source to a blue light objective lens and a red and infrared light objective lens. There is also provided blue light decay means for decaying the blue light along an optical branch path extending from the optical path branching means to the red and infrared light objective lens.

The provision of the blue light decay means for decaying the blue light along the optical branch path only allows a drastically reduced proportion of the blue light having spilled through the optical path branching means into the optical branch path to reach the red and infrared light objective lens. Therefore, the spilling of the blue light into the red and infrared light objective lens is greatly restrained. The red and infrared light objective lens is prevented from degradation caused by absorption of the blue light.

The optical pickup of the present invention is preferably such that the blue light decay means contains at least either a low blue light transmittance plane transmitting the red and infrared light and having a lower transmittance for the blue light than a reflectance for the blue light or a low blue light reflectance plane reflecting the red and infrared light and having a lower reflectance for the blue light than a transmittance for the blue light.

According to the configuration, the blue light decay means is either a low blue light transmittance plane or a low blue light reflectance plane. No matter how the optical branch path is arranged, the blue light is decayed in a suitable manner.

The optical pickup of the present invention is preferably such that the blue laser source emits at a wavelength of from 390 nm to 420 nm, inclusive.

Typical standards for the BD (Blu-ray Disc), HD-DVD (High Definition-DVD), and other blue light discs require that the blue laser source emit at a wavelength of about 405 nm. According to the configuration, the blue laser source emits at a wavelength of from 390 nm to 420 nm, inclusive. The setup enables the pickup to properly work with the BD, the HD-DVD, and other blue light discs without any serious problems.

The optical pickup of the present invention is preferably such that: the low blue light transmittance plane has a transmittance of not more than 30% for blue light at wavelengths of from 390 nm to 420 nm, inclusive; and the low blue light reflectance plane has a reflectance of not more than 30% for blue light at wavelengths of from 390 nm to 420 nm, inclusive.

Each of the configurations enables effective use of specified transmittance and reflectance because the BD, HD-DVD, and other blue light disc standards generally require that the blue laser source emit at a wavelength range of about 405 nm proximity.

The optical pickup of the present invention is preferably such that a plurality of the low blue light transmittance planes, a plurality of the low blue light reflectance planes, or a plurality of planes including at least one low blue light transmittance plane and at least one low blue light reflectance plane are provided along the optical branch path; and the low blue light transmittance plane(s) and the low blue light reflectance plane(s) decay blue light at wavelengths of from 390 nm to 420 nm, inclusive.

According to the configuration, only the low blue light transmittance planes may be provided in a plurality, only the low blue light reflectance planes may be provided in a plurality, or a plurality of planes including at least the low blue light transmittance plane and the low blue light reflectance plane may be provided. No matter how the optical branch path is arranged, the present invention is applicable in a suitable manner. In addition, since a typical blue laser source emits at a wavelength range of about 405 nm. The blue light is decayed effectively.

The optical pickup of the present invention is preferably such that the red and infrared light objective lens is made of an olefin-based resin or an alicyclic olefin-based resin.

A typical red and infrared light objective lens is made of an olefin-based resin or an alicyclic olefin-based resin. Therefore, according to the configuration, the present invention is applicable in a suitable manner even if an optical pickup compatible with the BD, the HD-DVD, or other like media utilizing blue light is provided with a red and infrared light objective lens made of an ordinary resin so that the pickup is compatible with the DVD, the CD, and other like media utilizing red and infrared light. In addition, any red and infrared light objective lens made of an ordinary resin can be used; the optical pickup can be manufactured at low cost.

The optical pickup of the present invention is preferably such that the optical path branching means is a blue light startup mirror transmitting the red and infrared light and reflecting the blue light in a direction where the blue light objective lens is located.

According to the configuration, the blue light can be separated from the red and infrared light in a suitable manner according to the layout of the blue light objective lens and the red and infrared light objective lens.

The optical pickup of the present invention is preferably such that the blue light startup mirror is planar and has, on each side thereof, a low blue light transmittance plane having a lower transmittance for the blue light than a reflectance for the blue light.

The configuration facilitates the provision of a low blue light transmittance plane along the optical branch path from the blue light startup mirror to the red and infrared light objective lens. In addition, the configuration has dimensional merits, making it possible to reduce the size of the device. The configuration also requires fewer components, contributing to cost reduction.

The optical pickup of the present invention is preferably such that: the blue light startup mirror is cubical and has a low blue light transmittance internal plane provided inside thereof and an external exit face through which the red and infrared light exits; the low blue light transmittance internal plane transmits the red and infrared light, reflects the blue light, and has a lower transmittance for the blue light than a reflectance for the blue light; and the exit face is provided with a low blue light transmittance plane having a lower transmittance for the blue light than a reflectance for the blue light.

According to the configuration, the blue light startup mirror is cubical. The configuration causes no shift of the optical axis, making it easy to design the device. The configuration also makes it easy to assemble the device, enabling reductions in assembly time.

The optical pickup of the present invention preferably further includes a red and infrared light startup mirror reflecting the red and infrared light having transmitted through the blue light startup mirror in a direction where the red and infrared light objective lens is located, wherein the red and infrared light startup mirror has a low blue light reflectance plane provided on a reflection surface thereof off which the red and infrared light is reflected, the low blue light reflectance plane having a lower reflectance for the blue light than a transmittance for the blue light.

The configuration is capable of both directing the red and infrared light to the red and infrared light objective lens and reducing the proportion of the blue light which reaches the red and infrared light objective lens.

The optical pickup of the present invention is preferably such that the optical path branching means is a red and infrared light startup mirror reflecting the red and infrared light in a direction where the red and infrared light objective lens is located and transmitting the blue light.

According to the configuration, the blue light can be separated from the red and infrared light in a suitable manner according to the layout of the blue light objective lens and the red and infrared light objective lens.

The optical pickup of the present invention is preferably such that the optical path branching means is a composite startup mirror integrating: a blue light startup mirror having a reflection surface transmitting the red and infrared light and reflecting the blue light in a direction where the blue light objective lens is located, the blue light startup mirror having a low blue light transmittance plane provided on the reflection surface, the low blue light transmittance plane having a lower transmittance for the blue light than a reflectance for the blue light; and a red and infrared light startup mirror having a reflection surface reflecting the red and infrared light having transmitted through the blue light startup mirror in a direction where the red and infrared light objective lens is located, the red and infrared light startup mirror having provided on the reflection surface a low blue light reflectance plane having a lower reflectance for the blue light than a transmittance for the blue light.

According to the configuration, the device is easy to assemble in comparison with a device in which a red and infrared light startup mirror is separately provided. Thus, the configuration allows for lower assembly precision, enabling reductions in assembly time.

The embodiments and examples described in Description of the Embodiments are for illustrative purposes only and by no means limit the scope of the present invention. Variations are not to be regarded as a departure from the spirit and scope of the invention, and all such modifications as would be obvious to one skilled in the art are intended to be included within the scope of the claims below.

What is claimed is:

1. An optical pickup, comprising:
   a blue laser source;
   at least either one of a red laser source and an infrared laser source;
   a blue light objective lens focusing blue light emitted from the blue laser source onto an optical storage medium;
   a red and infrared light objective lens focusing red light emitted from the red laser source and infrared light emitted from the infrared laser source onto the optical storage medium;
   optical path branching unit separating the blue light from the red and infrared light, the optical path branching unit being provided along optical paths extending from the blue laser source, the red laser source, and the infrared laser source to the blue light objective lens and the red and infrared light objective lens; and
   blue light decay unit decaying the blue light, the blue light decay unit being provided along an optical branch path extending from the optical path branching unit to the red and infrared light objective lens,
   wherein the blue light decay unit contains at least either a low blue light transmittance plane transmitting the red and infrared light and having a lower transmittance for the blue light than a reflectance for the blue light or a low blue light reflectance plane reflecting the red and infrared light and having a lower reflectance for the blue light than a transmittance for the blue light, and the low blue light transmittance plane has a transmittance of not more than 30% for blue light at wavelengths of from 390 nm to 420 nm, inclusive and the low blue light reflectance plane has a reflectance of not more than 30% for blue light at wavelengths of from 390 nm to 420 nm, inclusive.

2. The optical pickup according to claim 1, wherein the blue laser source emits at a wavelength of from 390 nm to 420 nm, inclusive.

3. The optical pickup according to claim 1, wherein a plurality of the low blue light transmittance planes, a plurality of the low blue light reflectance planes, or a plurality of planes including at least one low blue light transmittance plane and at least one low blue light reflectance plane are provided along the optical branch path.

4. The optical pickup according to claim 1, wherein the red and infrared light objective lens is made of an olefin-based resin or an alicyclic olefin-based resin.

5. The optical pickup according to claim 1, wherein the optical path branching unit is a blue light startup mirror having a branching plane for transmitting the red and infrared light and reflecting the blue light in a direction where the blue light objective lens is located.

6. The optical pickup according to claim 5, wherein the blue light startup mirror is planar and has, on each side thereof, a low blue light transmittance plane having a lower transmittance for the blue light than a reflectance for the blue light, and the branching plane is the low blue light transmittance plane disposed on a side of the blue light startup mirror on which blue light from the blue laser source is incident.

7. The optical pickup according to claim 5, wherein:
the blue light startup mirror is cubical and has a low blue light transmittance internal plane provided inside thereof and an external exit face through which the red and infrared light exits;
the low blue light transmittance internal plane transmits the red and infrared light, reflects the blue light, and has a lower transmittance for the blue light than a reflectance for the blue light so as to operate as the branching plane; and
the exit face is provided with a low blue light transmittance plane having a lower transmittance for the blue light than a reflectance for the blue light.

8. The optical pickup according to claim 5, further comprising a red and infrared light startup mirror reflecting the red and infrared light having transmitted through the blue light startup mirror in a direction where the red and infrared light objective lens is located,
wherein
the red and infrared light startup mirror has a low blue light reflectance plane provided on a reflection surface thereof off which the red and infrared light is reflected, the low blue light reflectance plane having a lower reflectance for the blue light than a transmittance for the blue light.

9. The optical pickup according to claim 1, wherein the optical path branching unit is a red and infrared light startup mirror having a branching plane for reflecting the red and infrared light in a direction where the red and infrared light objective lens is located and transmitting the blue light.

10. The optical pickup according to claim 1, wherein the optical path branching unit is a composite startup mirror comprising:
a blue light startup mirror having a branching plane for transmitting the red and infrared light and reflecting the blue light in a direction where the blue light objective lens is located, the branching plane being configured to operate as a low blue light transmittance plane having a lower transmittance for the blue light than a reflectance for the blue light; and
a red and infrared light startup mirror having a reflection surface reflecting the red and infrared light having transmitted through the blue light startup mirror in a direction where the red and infrared light objective lens is located, the red and infrared light startup mirror having a low blue light reflectance plane provided on the reflection surface, the low blue light reflectance plane having a lower reflectance for the blue light than a transmittance for the blue light.

* * * * *